(12) United States Patent  (10) Patent No.: US 6,740,235 B2
Gill  (45) Date of Patent: May 25, 2004

(54) SWIVELLING FILTER HEAD ASSEMBLY

(75) Inventor: Thomas Gill, Anaheim, CA (US)

(73) Assignee: Culligan International Company, Northbrook, IL (US)

( * ) Notice: Subject to any disclaimer, the term of this patent is extended or adjusted under 35 U.S.C. 154(b) by 150 days.

(21) Appl. No.: 10/090,247

(22) Filed: Mar. 4, 2002

(65) Prior Publication Data

US 2003/0168394 A1 Sep. 11, 2003

(51) Int. Cl.$^7$ .......................... B01D 27/00; B01D 27/08
(52) U.S. Cl. ....................... 210/238; 210/232; 210/252; 210/323.2; 210/335; 210/435; 210/443
(58) Field of Search ................................ 210/748, 232, 210/238, 253, 257.2, 259, 182, 321.78, 321.79, 323.2, 335, 435, 443, 252; 422/24, 186.3

(56) References Cited

U.S. PATENT DOCUMENTS

| | | | |
|---|---|---|---|
| 4,192,750 A | * 3/1980 | Elfes et al. ............... | 210/323.2 |
| 5,037,547 A | 8/1991 | Burrows | |
| 5,045,197 A | 9/1991 | Burrows | |
| 5,194,149 A | * 3/1993 | Selbie et al. ................ | 210/232 |
| 5,221,473 A | 6/1993 | Burrows | |
| 5,266,215 A | * 11/1993 | Engelhard ................... | 210/748 |
| 2003/0102257 A1 | * 6/2003 | Reid ........................... | 210/232 |

* cited by examiner

Primary Examiner—David A. Reifsnyder
(74) Attorney, Agent, or Firm—Greer, Burns & Crain, Ltd.

(57) ABSTRACT

A filter head assembly is configured for connection to a water line and including at least two filter heads connected to each other for treating water supplied through the water supply line and at least one of the filter heads accommodating a replaceable filter bowl. The assembly includes at least one head housing having an inlet port, an outlet port, a central chamber in fluid communication with the ports and a bowl connection opening in fluid communication with the chamber. Each of the ports is pivotally connected to one of a tubular connector and an end plug fitting so that the head housing can pivot relative to the respective connector and/or fitting.

19 Claims, 4 Drawing Sheets

SWIVELLING FILTER HEAD ASSEMBLY

BACKGROUND OF THE INVENTION

The present invention relates generally to water treatment devices, and specifically to such devices used in commercial establishments such as restaurants, hotels, schools, as well as residences, for the treatment of water for drinking directly or for incorporation into beverages.

In commercial establishments, when local water is mixed with beverage ingredients to provide soft drinks and juices, it is common to provide a water treatment system incorporating at least one treatment or filter unit. The feed water is introduced into a filter media, typically including, but not restricted to activated carbon, and/or passed through filter, reverse osmosis (RO) or nanofiltration (NF) membranes. For the purposes of this application, "filtering" will be understood to mean other types of treatment, not restricted to filtering, and filtering and treatment will be used interchangeably. The treatment operation is performed to enhance and standardize the taste of the drinking water as well as beverages made from that water. Some beverage manufacturers require certain levels of treatment in feed water used by formulators of licensed beverage products.

Since these commercial systems typically include at least one filter head which is plumbed into the feed water supply and at least one replaceable filter cartridge or media-containing filter bowl, the system should be installed in a location which is readily accessible to staff members to perform the periodic replacement of the media or cartridge. However, space availability is often a premium in such establishments, which limits the potential location of the treatment systems.

In addition, conventional water treatment systems typically involve multiple filter units connected to each other in series so that the feed water is treated by all units in the system. These systems are usually plumbed using conventional plastic or metal threaded piping, often requiring professional plumbers to install. Modifications or repairs to the system typically must also be performed by such skilled personnel.

Another disadvantage of conventional filter systems of this type is that when the filter heads are connected to the water lines and/or to adjacent filter heads using threaded plastic pipe, as is now common, there is a tendency for the fittings to become over-tightened during installation and/or repair. It is not uncommon for a head or the connector nipples to become cracked during this tightening procedure, which requires the replacement of the entire head and/or the connector fitting. This is an expensive and time-consuming operation. Also, if the crack is undetected, the unit may leak, potentially causing water damage at the facility.

A related disadvantage is that the use of conventional threaded pipe connections requires the system to be mounted in a location that provides sufficient clearance to use a pipe wrench or pliers to remove or replace the heads. This requirement adds another limitation on the placement of the system in an otherwise crowded facility.

Also, manufacturers of such treatment systems often provide a range of systems having different filtering capabilities. Some systems require additional filtering or treatment technologies, including, but not limited to RO units, or irradiation from ultraviolet (UV) sources. To improve manufacturing efficiency, it is desirable to be able to incorporate the range of available treatment technologies into a single head, or into a limited number of head configurations.

Another drawback of conventional filter systems of this type is that relatively expensive stamped metal brackets are often used to mount the system to a wall. These brackets typically include support gussets and machined fastener openings which add to assembly time and cost.

Thus, there is a need for a filter head system which is more efficiently and easily mounted in a facility, and which is easily repaired or replaced. Hopefully such repair can be accomplished without the use of tools. In addition, there is a need for a filter head housing which can optionally accommodate a variety of treatment technologies to increase the versatility of the head.

A first object of the present invention is to provide an improved filter head assembly which is easily mounted to a wall without regard to the clearance of the filter bowl or the need for wrench clearance.

Another object of the present invention is to provide an improved filter head assembly which can be assembled by unskilled personnel, preferably without the use of tools.

A further object of the present invention is to provide an improved filter head assembly which is installed without using threaded connectors between filter adjacent filter heads.

A still further object of the present invention is to provide an improved filter head assembly incorporating the above-listed objects and in which the head housing is adaptable to include a variety of treatment technologies.

Yet another object of the present invention is to provide an improved filter head assembly including the above-listed objects and employing a relatively inexpensive wall mounting bracket.

BRIEF SUMMARY OF THE INVENTION

The above-listed objects are met or exceeded by the present swiveling filter head assembly, which features a filter head housing configured for use in single or multiple filter combinations. A main advantage of the present filter head is that it is swivelable about a horizontal axis typically defined by the supply (inlet) and treated (outlet) water lines. Another feature of the present invention is that, in one embodiment, adjacent heads of the present configuration can be assembled together and placed in sealed fluid communication without the use of tools. If desired, a wall support bracket may be provided, which does involve tools during assembly. Still another feature of the present filter assembly is that the head housing can optionally accommodate supplemental treatment devices, including RO units or UV bulbs, without sacrificing the other advantages or features described above.

More specifically, the present invention provides a filter head assembly for connection to a water line and including at least two filter heads connected to each other for treating water supplied through the water supply line and at least one of the filter heads accommodating a replaceable filter bowl. The assembly includes at least one head housing having an inlet port, an outlet port, a central chamber in fluid communication with the ports and a bowl connection opening in fluid communication with the chamber. Each of the ports is pivotally connected to one of a tubular connector and an end plug fitting so that the head housing can pivot relative to the respective connector and/or fitting.

In another embodiment, a filter head for connecting a supply of raw water to a filter media disposed in a filter bowl includes a head housing having an inlet port, an outlet port, a central chamber in fluid communication with the ports and a bowl connection opening in fluid communication with the chamber. Each of the ports is pivotally connected to an end plug fitting so that the head housing can pivot relative to the respective connector and/or fitting for access to the bowl connection opening. A support is also included and is disposed in operational relationship to each port for supporting the housing on a wall.

DETAILED DESCRIPTION OF THE INVENTION

Figure 1:
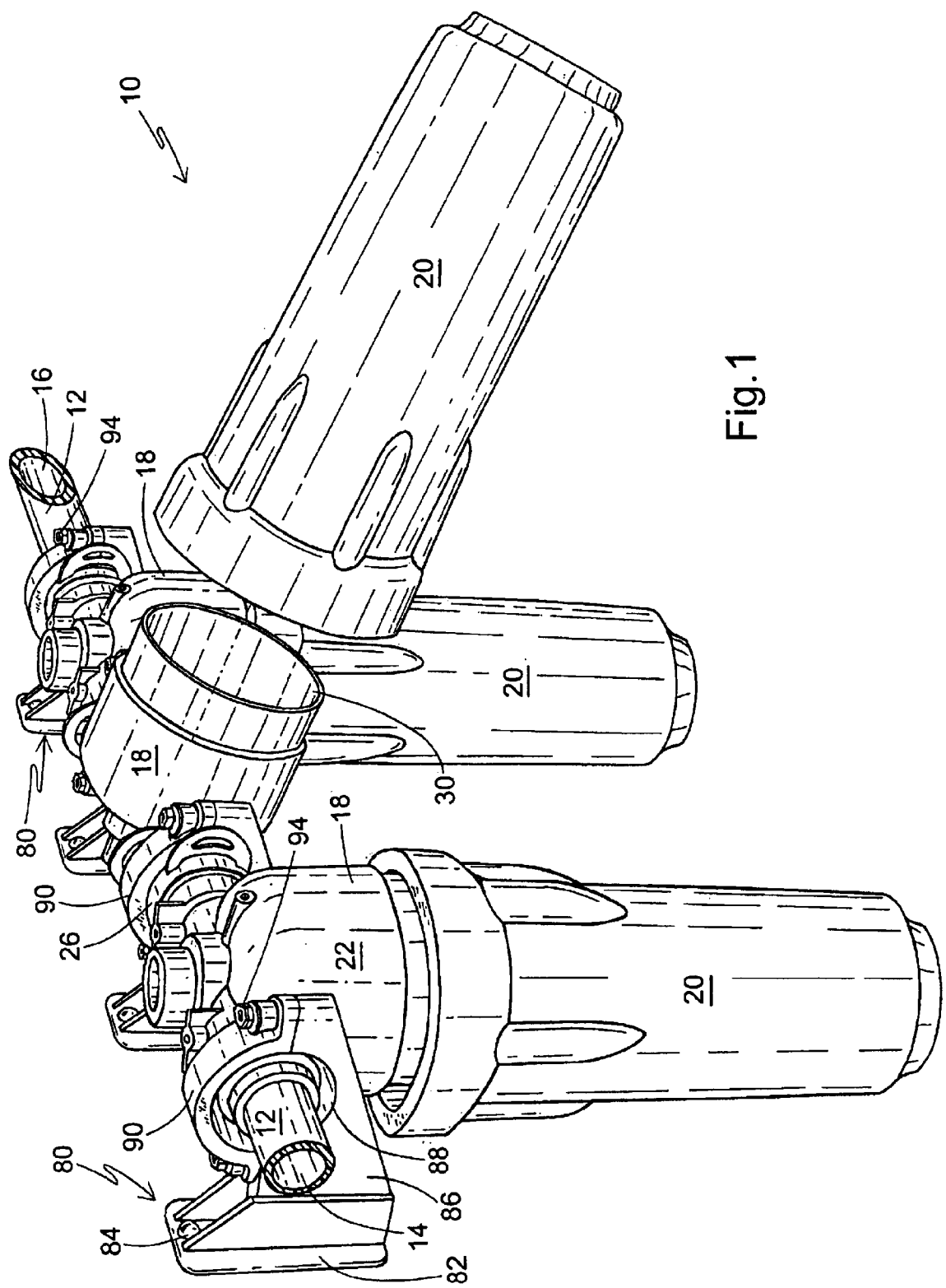
FIG. 1 is a perspective elevational view of the present system mounted to a wall.
Figure 2:
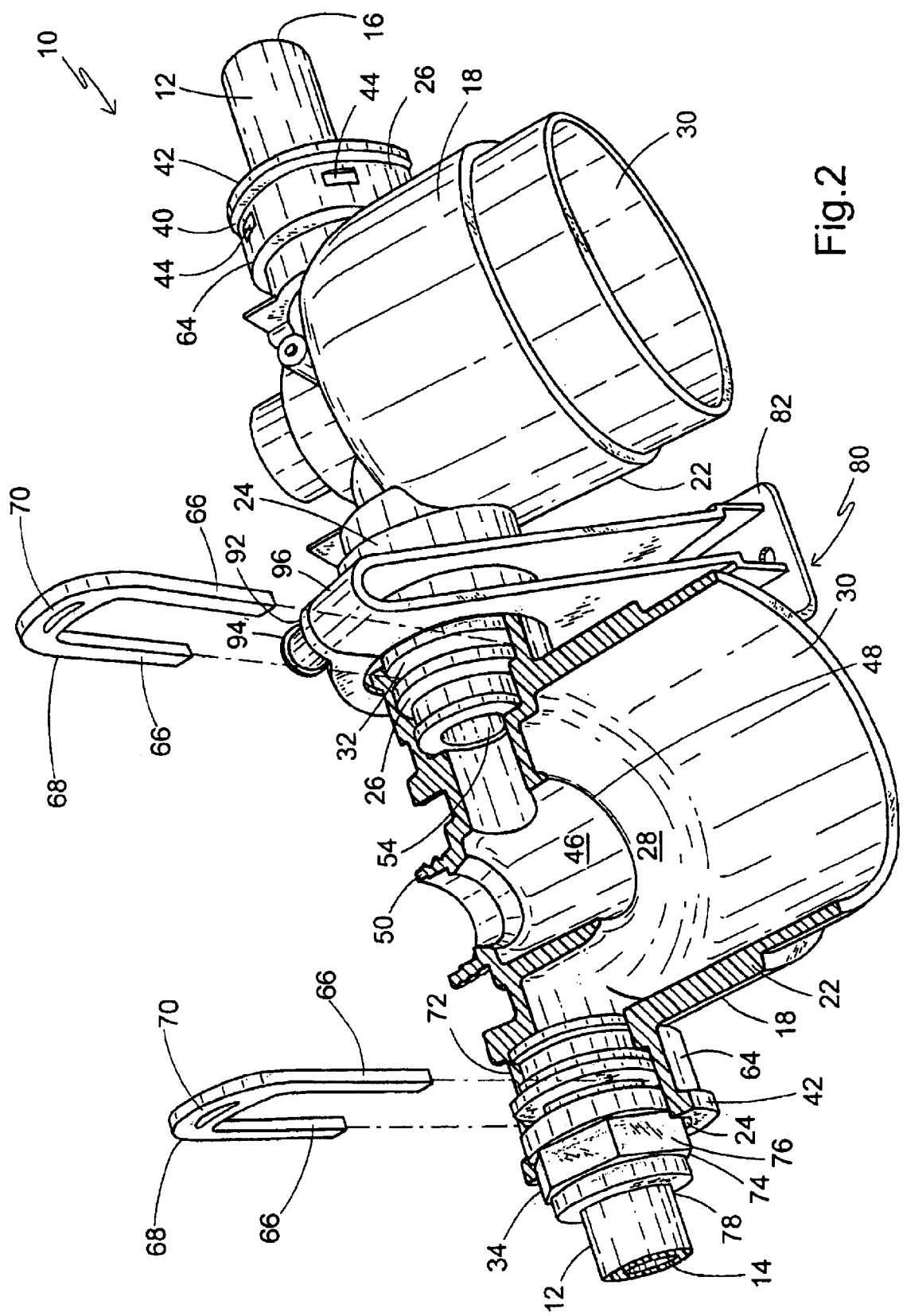
FIG. 2 is a fragmentary perspective view of a portion of the system shown in FIG. 1.
Figure 3:
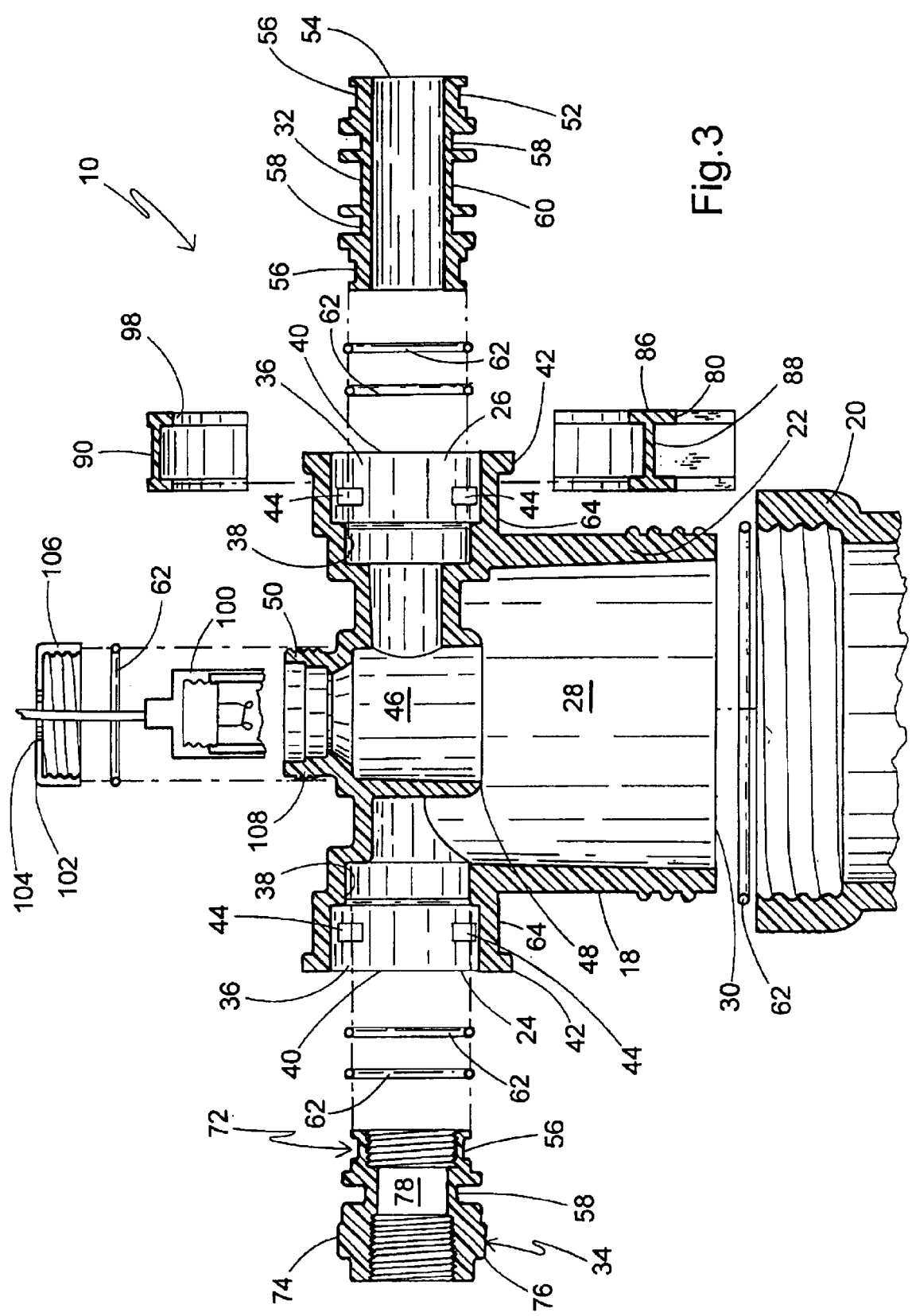
FIG. 3 is an exploded front view of the present system.

Referring now to FIGS. 1–3, the present filter head assembly is generally designated 10, and is preferably configured for connection to a water line 12 for treating feed water to make it suitable for drinking or making into beverages such as soft drinks or juices. The system 10 is typically connected in in-line fashion between portions of the water line 12, so that the line 12 thus includes a feed inlet line 14 and a treated line 16.

The system 10 generally includes at least one filter head 18 in fluid communication with the water line 12, and at least one filter bowl 20 configured for retaining a filter media and also for being releasably connected to the filter head 18. While shown as a threaded connection, bayonet lug connections, cam locks and other known attachment technologies are contemplated. It is contemplated that the filter bowl 20 can enclose at least one of a variety of filter or treatment media, including, but not limited to activated carbon, filter fibers, carbon fiber block, RO membranes, NF membranes, UV treatment systems or other known treatment technologies.

While conventional filter heads are securely fixed to the water line 12 and to adjacent filter heads, an important feature of the present invention is that the heads 18 are swivellable or pivotable relative to the line 12 and to adjacent heads. More specifically, this advantage is achieved through the provision of a filter head housing 22 having an inlet port 24, an outlet port 26, and a central chamber 28 in fluid communication with the ports. It is contemplated that the flow pattern/function (inlet/outlet) of the ports 24, 26 may be changed depending on the application, the treatment system, and the type of media. The bowl 20 is in fluid communication with a bowl connection opening 30 defined by the head housing 22 at the bottom of the chamber 28.

The swiveling action is achieved by each of the ports 24, 26 being pivotally connected to one of a tubular connector 32 and an end plug fitting 34 so that the head housing 22 can pivot or swivel relative to the respective connector and/or fitting. An advantage of this swiveling action is that access to the bowl 20 and/or the bowl connection opening 30 is facilitated, regardless of the location of the system 10 on a wall.

More specifically, each of the ports 24, 26 is provided with a fastener portion 36 having a first diameter, and a sealing portion 38 having a second, and preferably smaller diameter relative to the fastener portion 36. An outer end 40 of the fastener portion has a radially projecting flange 42. In addition, at least one and preferably four fastener apertures 44 (FIG. 3), each of which is preferably rectangular or square in shape. However, the number, positioning and shape of the apertures 44 may vary to suit the application.

As is known in the art, to ensure that the inlet water is treated prior to release from the outlet port 26, the outlet port is provided with a diverter conduit 46 which is generally "L" shaped or provided with an elbow. The diverter conduit 46 is placed in fluid communication, usually via a tube or conduit (not shown) with the base of the filter media. Thus, the inflowing water which has passed through the filter media and has thus been treated will collect at the bottom of the media and be collected by the tube for passage into the diverter conduit 46 and out the outlet port 26. The operation of fluid filters of this type is well known in the art, and the specific media, as well as the flow direction (upflow or downflow) may vary to suit the application. The determination of upflow or downflow orientation will also determine the designation of the ports 24, 26 as inlet or outlet ports.

Another feature of the present assembly 10 is that a lower edge 48 is configured to form an angled, wedge-shape or knife-edge. This configuration facilitates sealing engagement with certain types of filter media arrangements. Still another feature of the present assembly 10 is that the filter head housing 22 has an optional upper access port 50 which, if opened through an optional secondary manufacturing operation, can accommodate a supplemental filtering or treatment device, such as an RO unit, a UV light bulb, or other equivalent technology. The details of such an option are provided in greater detail below.

Referring now to FIGS. 2 and 3, as described above, each of the ports 24, 26 is pivotally connected to one of the tubular connector 32 and the end plug fitting 34 so that the head housing 22 can pivot or swivel relative to the respective connector and/or fitting. When multiple filter heads 22 are placed adjacent each other, they are connected together using the tubular connector 32. In the illustrated examples, that connection is made at the outlet port 26 of the first head housing 22. The tubular connector 32 includes a generally cylindrical body 52 with a central axial throughbore 54 configured for enabling fluid communication between adjacent head housings 22.

When viewed from the front, as shown in FIG. 3, the tubular connector 32 is symmetrical, having at each end an outer sealing portion 56 and an inner fastening portion 58. The two fastening portions 58 are separated by a central portion 60, the dimension of which may change to suit the application. However, an advantage of the present system 10 is that, by using the tubular connector 32, the adjacent filter head housings 22 may be mounted more closely together than was previously possible using the prior art threaded pipe connectors. In this manner, a closer mounting reduces the amount of space in the facility taken up by the present system 10. Thus, the central portion 60 will preferably be as axially short as possible.

More specifically, the sealing portions 56 are shaped to form O-ring or seal grooves for accommodating at least one and preferably two O-rings 62. It has been found that placing two O-rings 62 in the same groove 56 enhances the sealing qualities of the arrangement. While O-rings 62 are preferred, it is also contemplated that other equivalent sealing technologies may be used, including but not limited to lip seals or seal ridges molded into the connector 32 or the corresponding sealing portion 38 of the respective ports 24, 26. It is also preferred that at least one O-ring 62 be located between the bowl 20 and the bowl connection opening 30 to seal that junction, as is well known in the art.

The fastening portions 58 at each end of the tubular connector 32 are configured to form at least one fastener groove for receiving an elongate fastener which passes through one of the corresponding fastener apertures 44 located in an outer wall 64 of the fastener portion 36. Upon assembly of the system 10, the fastener apertures 44 are in registry with the corresponding fastener grooves 58. In the preferred embodiment, the apertures 44 are each configured to receive a corresponding one of preferably two elongate legs 66 of a generally "U"-shaped fastener spring clip 68 (FIG. 2). The legs 66 pass through the apertures 44 and engage the fastener grooves 58 to prevent the head housing 22 from moving laterally or axially relative to the tubular connector 32. At the same time, the engagement of the legs 66 in the grooves 58 allows the secured fastener spring clip 68 and the associated port 26 to pivot or swivel about the connector 32. The sealing relationship between the tubular connector 32 and the port 26 is preserved during this pivoting action by the O-rings 62.

An advantage of the "U"-shape of the fastener spring clips 68 is that each clip has two legs 66, increasing the fastening power of each clip, and also, a base portion 70 of the clip facilitates gripping so that the clip may be installed or removed without the use of tools. Accordingly, to fasten adjacent head housings 22, one merely places corresponding outlet and inlet ports 26, 24 in alignment, places a tubular connector 32 between the housings so that the connector is engaged in the corresponding ports, supplies the necessary O-rings 62 in the grooves 56, and inserts the clips 68 into the corresponding apertures 44. Typically there will be one clip 68 for each port 24, 26, or two clips per connector 32. However, the number, construction and arrangement of the clips 68 or other fastener may vary to suit the application. Thus, the assembly of adjacent units can be accomplished without the use of tools.

Once the number of head housings 22 is determined, the resulting assembly of housings is secured to the water line 12 by the end plug fitting 34. Unlike the tubular connector 32, the end plug fitting 34 is not symmetrical, but has only one end 72 with an outer sealing portion 56 and an inner fastening portion 58 which is identical to an end of the tubular connector 32. As such, the end plug fitting 34 is attached to the head housing 22 using a fastener spring clip 68 engaging fastener apertures 44 in the same manner described above in relation to the tubular connector 32.

The other end 74 of the end plug fitting 34 is configured to attach to the water line 12, and as such is typically internally threaded and provided with a faceted exterior 76 to be gripped by a wrench or pliers. Naturally, the interior of the end plug fitting 34 has a throughbore 78 configured for passing water from the line 12 to the interior of the head housing 22.

An advantage of the above-described system 10 is that at least one and preferably two or more head housings 22 can be connected to a water line and preferably together in a way which requires less space than conventional systems. As such, once assembled as above, the system 10 can be placed so that the filter bowls 20 rest on the floor of a facility and are not attached to the wall. If the filter bowl 20 needs replacement or refilling, the head housing 22 is pivoted or swiveled outward (best seen in FIG. 1) for easy access. This type of installation is not available with conventional systems where there is a need to provide clearance below the bowl 20 for removal.

However, despite the above-listed advantage, it is also contemplated that the system 10 may be mounted so that it is fixed to a wall. To that end, a support bracket 80 is provided which supports the assembly 10 on the wall, and is configured to engage a corresponding one of the ports 24, 26. Thus, each system 10 will need at least two such brackets 80 to secure it to the wall. A system 10 of three head housings 22 will require four brackets 80.

Figure 4:
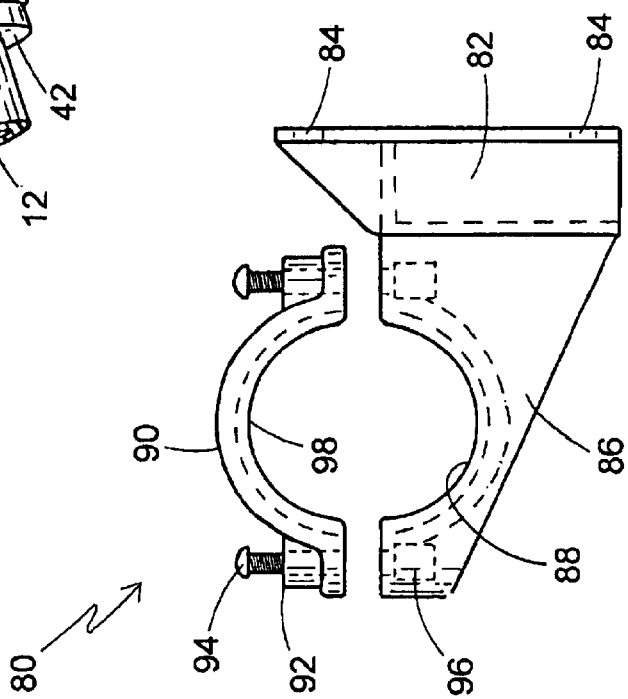
FIG. 4 is a side elevation of the bracket and clamp of the present system.

Referring now to FIGS. 1, 2 and 4, the brackets 80 include a mounting portion 82 with at least one opening 84 for receiving threaded fasteners, expansion bolts or the like to secure the bracket to the wall as is well known in the art. Attached to the mounting portion 82 is a hook-like support portion 86 with a depression 88 configured for accommodating and retaining the perimeter of the port 24, 26. To retain the ports 24, 26, the bracket 80 includes at least one clamp 90. The clamp 90 is preferably arcuate in shape and is provided with a pair of eyelets 92 which receive fasteners 94. In the preferred embodiment, the fasteners 94 are threaded, however other fasteners are contemplated, including rivets, cotter pins or other similar types of fasteners. As is known in the art, the fasteners 94 engage threaded bosses 96 in the support portion 86 for securing the clamp 90 to the support portion.

Another function of the clamp 90 is that it exerts a radial compression force which holds the respective ports 24, 26 securely against the corresponding tubular connector 32 or the end plug fitting 34. The clamp 90 includes a pair of depending edges 98 which capture the corresponding radially projecting flange 42 of adjacent head housings 22, and thus secure the adjacent head housings together and in operational relationship to the corresponding connector or fitting 32,34. The engagement between the clamp edges 98 and the flange 42 is such that the featured swiveling action is preserved. In fact, if desired, the use of the clamp 90 and the bracket 80 can be a substitute for the use of the U-clips 68 as the fastening apparatus for the present system 10 at the junction between adjacent head housings 22. If the clamp 90 and the bracket 80 are used to replace the U-clips 68 at the ends of the system 10, the end plug fitting 34 needs to be provided with a formation corresponding to the flange 42 configured for being engaged by and retained in the inlet 24 by the clamp 90 and the bracket 80.

Referring again to FIG. 3, if it is desired to supplement the filter or treatment media in the filter bowl 20, the optional support port 50 is provided in an open condition. The supplemental treatment device, generally designated 100, which is contemplated as being an RO unit, preferably of the type disclosed in U.S. Pat. No. 5,221,473 which is incorporated by reference, a UV bulb or similar supplemental treatment technology. To retain the supplemental device 100 in place in a sealed relationship, the present system 10 further includes an add-on seal retainer 102 with a central bore 104 and a depending threaded skirt 106. The skirt threadably engages a threaded exterior wall 108 of the port 50 and retains at least one and preferably two O-rings 62 in place against the exterior of the supplemental treatment device to prevent leaks. In a multi-head assembly 10, it is contemplated that one or more of the head housings 22 can be provided with different supplemental treatment device 100, or no such device at all. Thus, an assembly 10 including three head housings 22 may include an RO unit in one housing 22, a UV bulb in another, and a third housing 22 without any supplemental device 100. The arrangement and number of head housings 22 and supplemental treatment devices 100 may vary to suit the application, and may include pressure gauges, test probes and/or other fittings.

Figure 5:
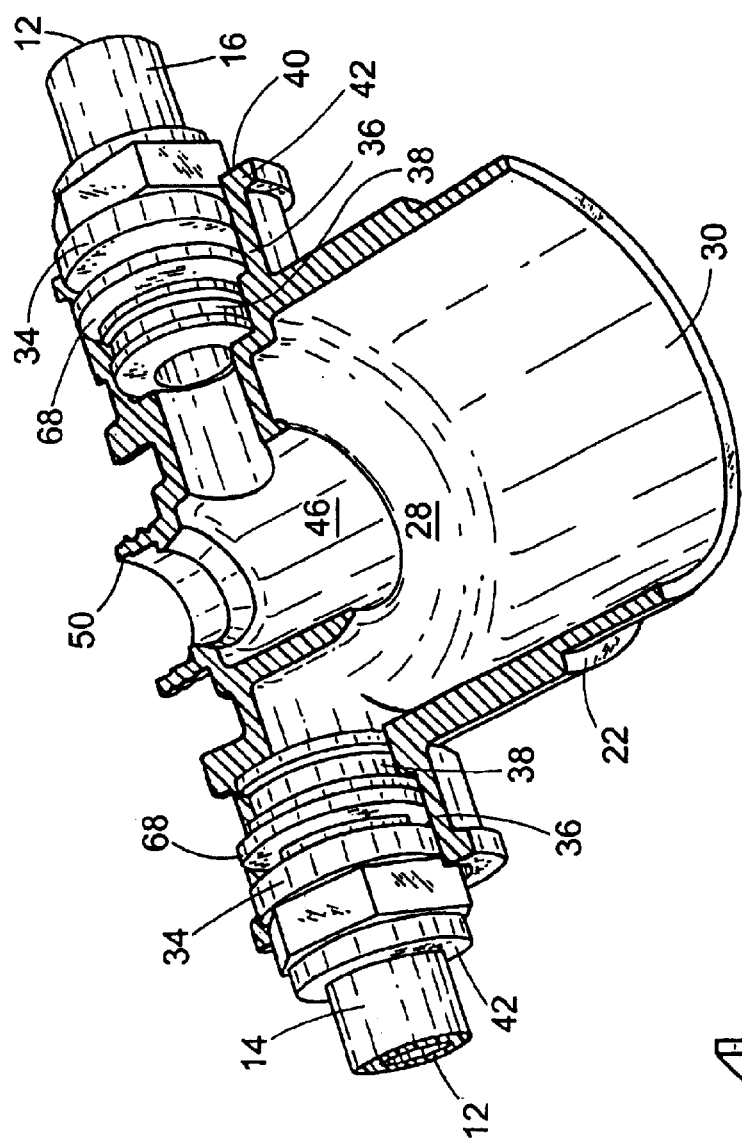
FIG. 5 is a front view of an alternate embodiment of the present system using only one filter head housing.

Referring to FIG. 5, an embodiment of the system 10 is illustrated in which only one head housing 22 is provided. In this configuration, there is an end plug fitting 34 located in each of the ports 24, 26. In addition, there is a clamp 90 and a bracket 80 disposed at each of the ports 24, 26. The head housing 22, as well as its filter bowl 20, is supported at both ends by the bracket 80 and the clamp 90.

Thus, it will be seen that the present filter head system 10 provides the capability of installation where space is limited in that the filter head housings 22 may be pivoted out for easy bowl replacement. The single filter head housing 22 is versatile, in that it may accommodate a variety of arrangements employing one or more filter head 18, and may also feature optional supplemental treatment devices. Installation of multiple units can be accomplished without the use of tools. If wall mounting is required, some simple tools such as a screwdriver may be needed. Adequate sealing is provided to prevent leaks despite the pivoting action of the head housing 22.

While a particular embodiment of the present swiveling filter head assembly has been described herein, it will be appreciated by those skilled in the art that changes and modifications may be made thereto without departing from the invention in its broader aspects and as set forth in the following claims.

What is claimed is:

1. A filter head assembly configured for connection to a water line and including at least two filter heads connected to each other for treating water supplied through the water supply line, at least one of said filter heads accommodating a replaceable filter bowl, said assembly comprising:
   at least one head housing having an inlet port, an outlet port, a central chamber in fluid communication with said ports and a bowl connection opening in fluid communication with said chamber;
   each of said ports being pivotally connected to one of a tubular connector and an end plug fitting so that said head housing can pivot about a horizontal axis defined by said respective connector and/or fitting.

2. The assembly of claim 1 further including fastening means for fastening at least one of said ports to one of said connector and said fitting.

3. The assembly of claim 2 wherein said fastening means includes at least one fastener groove on said connector and said fitting, each said port having an outer wall with at least one fastener aperture in registry with said groove upon assembly, and at least one fastener configured for engaging said groove through said aperture to pivotally attach said port to said connector or said fitting and prevent relative lateral movement of said port and said connector or said fitting.

4. The assembly of claim 3 wherein said fastener is a spring clip.

5. The assembly of claim 2 wherein said fastening means includes at least one clamp for exerting a radial compression force holding said outlet against said connector or said fitting.

6. The assembly of claim 5 wherein said clamp is provided with a bracket for providing a base to secure said housing.

7. The assembly of claim 6 wherein said bracket is configured for attachment to a wall.

8. The assembly of claim 5 wherein each said port has a radially extending end flange, and said at least one clamp is configured for engaging said flanges of adjacent ports and drawing said ports together about said connector.

9. The assembly of claim 1 wherein said plug fitting is threaded at one end for threadably engaging a water supply line.

10. The assembly of claim 1 wherein said connector and said plug fitting are sealingly connected to said corresponding port in said housing.

11. The assembly of claim 10 wherein said fitting and said connector are provided with at least one seal groove configured for receiving at least one O-ring.

12. The assembly of claim 1 wherein said head housing further includes an accessory port configured for receiving at least one of an RO unit and a UV bulb.

13. The assembly of claim 12 further including a seal retainer configured for sealingly positioning an annular seal about said accessory port.

14. The assembly of claim 1 wherein said adjacent housings are sealingly fastened together only by said tubular connector and at least one spring clip without the use of tools.

15. A filter head for connecting a supply of raw water to a filter media disposed in a filter bowl, said head comprising:
   a head housing having an inlet port, an outlet port, a central chamber in fluid communication with said ports and a bowl connection opening in fluid communication with said chamber;
   each of said ports being pivotally connected to an end plug fitting so that said head housing can pivot about a horizontal axis defined by said respective connector and/or fitting for access to said bowl connection opening; and
   a support disposed in operational relationship to each said port for supporting said housing on a wall.

16. The filter head of claim 15 wherein each said end plug fitting includes at least one fastener groove, at least one seal groove and a connection point for a water supply line.

17. The filter head of claim 16 wherein each said port includes an outer wall having at least one fastener opening, and further including a fastener configured to engage said at least one fastener groove through said opening to secure said fitting to said port.

18. The filter head of claim 15 wherein said support includes a clamp and a bracket configured for sandwiching said port and said fitting therebetween.

19. The filter head of claim 18 wherein each said port has a radially extending end flange, and said clamp is configured for engaging and capturing said flange.

* * * * *